United States Patent
Kobayashi et al.

(10) Patent No.: US 7,196,036 B2
(45) Date of Patent: Mar. 27, 2007

(54) CATALYST FOR DECOMPOSITION OF HYDROCARBONS, PROCESS FOR PRODUCING THE CATALYST, AND PROCESS FOR PRODUCING HYDROGEN USING THE CATALYST

(75) Inventors: Naoya Kobayashi, Hiroshima (JP); Shinji Takahashi, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 222 days.

(21) Appl. No.: 10/783,021

(22) Filed: Feb. 23, 2004

(65) Prior Publication Data

US 2004/0209773 A1    Oct. 21, 2004

(30) Foreign Application Priority Data

Feb. 24, 2003 (JP) .............................. 2003-046618

(51) Int. Cl.
*B01J 23/02* (2006.01)
*B01J 23/06* (2006.01)

(52) U.S. Cl. ................ 502/335; 502/327; 502/328; 502/337; 502/341; 502/355; 502/415; 502/439

(58) Field of Classification Search ........... 502/327, 502/328, 335, 337, 341, 355, 415, 439
See application file for complete search history.

(56) References Cited

U.S. PATENT DOCUMENTS

| | | | | |
|---|---|---|---|---|
| 2,890,178 A | * | 6/1959 | Thorn et al. | 502/230 |
| 3,368,982 A | * | 2/1968 | Milbourne | 502/335 |
| 3,432,363 A | * | 3/1969 | Gillis | 429/12 |
| 3,479,276 A | * | 11/1969 | Becker et al. | 204/290.08 |
| 3,825,504 A | * | 7/1974 | Hilfman | 502/335 |
| 3,825,505 A | * | 7/1974 | Hilfman | 502/335 |
| 3,849,343 A | * | 11/1974 | Hoekstra | 502/328 |
| 3,932,514 A | * | 1/1976 | Thelen et al. | 568/362 |
| 3,932,534 A | | 1/1976 | Fukunaga et al. | |
| 4,857,499 A | * | 8/1989 | Ito et al. | 502/326 |
| 4,870,044 A | * | 9/1989 | Kukes et al. | 502/220 |
| 4,944,985 A | * | 7/1990 | Alexander et al. | 428/570 |
| 5,653,774 A | | 8/1997 | Bhattacharyya et al. | |
| 6,007,946 A | * | 12/1999 | Yano et al. | 429/223 |
| 6,413,639 B1 | * | 7/2002 | Kobayashi et al. | 428/403 |
| 6,509,405 B1 | * | 1/2003 | Kobayashi et al. | 524/436 |
| 6,638,889 B1 | * | 10/2003 | Van Berge et al. | 502/300 |

FOREIGN PATENT DOCUMENTS

| | | | |
|---|---|---|---|
| EP | 0 624 397 A1 | * | 11/1994 |
| EP | 1 285 692 A1 | | 2/2003 |
| JP | 11-276893 | | 10/1999 |
| WO | WO 03/099436 A1 | | 12/2003 |

OTHER PUBLICATIONS

DATABASE WPI Section Ch, Week 200003 Derwent Publications Ltd., London, GB; Class E17, AN 2000-026684; XP002280393 and JP 11 276893 A, Oct. 12, 1999.

* cited by examiner

*Primary Examiner*—Cam N. Nguyen
(74) *Attorney, Agent, or Firm*—Nixon & Vanderhye P.C.

(57) ABSTRACT

A catalyst for decomposition of hydrocarbons, comprises porous oxide particles containing magnesium and aluminum, and fine metallic nickel particles which are present in the vicinity of surface of the respective porous oxide particles, and have an average particle diameter of 1 to 10 nm, said catalyst having a nickel content of 0.15 to 12% by weight based on the weight of the catalyst and a molar ratio of nickel to a sum of magnesium, nickel and aluminum of 0.001 to 0.12 in which a molar ratio of magnesium to aluminum (Mg:Al) is 4:1 to 1.5:1. The catalyst for decomposition of hydrocarbons, is capable of maintaining as small a particle size of metallic nickel particles as not more than 10 nm at a considerably reduced nickel content, and exhibits an excellent anti-coking property even under a low steam atmosphere.

8 Claims, No Drawings

CATALYST FOR DECOMPOSITION OF HYDROCARBONS, PROCESS FOR PRODUCING THE CATALYST, AND PROCESS FOR PRODUCING HYDROGEN USING THE CATALYST

This application claims priority to JP Patent Application 2003-46618 filed 24 Feb. 2003. The entire contents of this application is incorporated herein by reference.

BACKGROUND OF THE INVENTION

The present invention relates to a catalyst for decomposition of hydrocarbons, a process for producing the catalyst and a process for producing hydrogen using the catalyst, and more particularly, to a catalyst for decomposition of hydrocarbons in which fine metallic nickel particles as a catalytically active component exist in the vicinity of the surface of particles constituting the catalyst, thereby minimizing the nickel content, and which exhibits an excellent catalytic activity, a process for producing the catalyst, and a process for producing hydrogen using the catalyst.

Hydrogen has now been noticed as a raw material for new energy and applied to fixed bed fuel cells that are expected to come into wide use in home and small- or medium-scale offices, as well as electric power plants. Therefore, "in-situ" production of hydrogen has been required. For example, in the case of fuel cells for domestic use in which hydrogen is produced from city gas, there have been generally used catalysts on which noble metal elements are supported, resulting in very expensive fuel cell systems. In particular, in order to widely spread the fuel cell systems for domestic use, it is inevitably required to develop low-price systems. Meanwhile, a large portion of the price of the whole fuel cell system is occupied by that of the catalyst used therein. That is, in order to promote wide spread of the fuel cell systems for domestic use, it is required to not only develop a higher-performance catalyst but also realize reduction in price thereof. Therefore, it has been strongly demanded to provide catalysts using more inexpensive elements instead of those using expensive noble metal elements.

For example, nickel is one of the more inexpensive metal elements suitable as an alternative material for noble metal elements. As the method for producing the conventional nickel-based catalysts, there are known a method of spraying an aqueous nickel salt solution, etc., to a bead-shaped carrier made mainly of alumina and then heat-treating the sprayed carrier to support metallic nickel onto the surface of the bead-shaped carrier; a method of preparing particles containing aluminum, nickel, etc., by co-precipitation method and then shaping and heat-treating the obtained co-precipitated product; or the like.

Further, in the case where hydrogen is produced by steam-reforming of low-molecular hydrocarbons, the low-molecular hydrocarbons are contacted with a catalyst in the presence of steam, thereby obtaining hydrogen. However, when the catalysts produced by the above-described conventional methods are applied to such a steam-reforming process, the catalysts suffer from such a coking phenomenon that carbon is deposited on the surface of the catalysts, resulting in deterioration in catalytic activity thereof.

The catalyst used upon the production of hydrogen exhibits more excellent properties as the particle size of metallic nickel particles contained therein is reduced. Namely, the nickel-based catalysts which have an excellent anti-coking property and are optimum for production of hydrogen, are produced by reducing the particle size of the metallic nickel particles to not more than 40 nm, especially not more than 10 nm.

However, the conventional nickel-based catalysts used for production of hydrogen contain metallic nickel particles having a particle size as large as several ten nanometers and, therefore, exhibit a poor anti-coking property, so that properties thereof are considerably deteriorated with the passage of time.

Although the use of hydrogen as a raw material for new energy instead of petroleum reduces a burden to global environments, an increased amount of nickel used not only lead to higher catalyst costs, but also is undesirable from the viewpoint of saving of resources. Therefore, it is necessary to provide a catalyst having a nickel content as low as possible. Further, since the use of a large amount of steam is disadvantageous from the standpoint of energy consumption, it has been strongly required to provide a catalyst capable of retaining its catalytic activity even upon use of a small amount of steam.

In the case where the amount of nickel used in the conventional nickel-based catalysts is reduced, the metallic nickel particles tend to be agglomerated upon spraying or heat treatment thereof. Therefore, there tends to be caused such a problem that the catalyst properties, especially its methane conversion percentage, are remarkably deteriorated in proportion to the reduced amount of nickel.

Thus, it has been strongly required to provide a catalyst capable of not only maintaining a fine particle size of the metallic nickel particles but also exhibiting an excellent anti-coking property even under a low steam atmosphere, and maintaining a good methane conversion percentage even at a less nickel content.

Conventionally, there has been proposed the use of a compound composed mainly of magnesium, nickel and aluminum as a catalyst (Japanese Patent Publication (KOKOKU) No. 48-13828(1973), Japanese Patent Application Laid-Open (KOKAI) No. 50-4001(1975), Japanese Patent Application Laid-Open (TOKUHYO) No. 2000-503624, and Japanese Patent Application Laid-Open (KOKAI) Nos. 11-276893(1999) and 2001-246257). Also, it is described that the catalyst including a carrier made of an oxide of magnesium and aluminum, and containing metallic nickel carried thereon in an amount of about 15 to 280% by weight is used as a catalyst for production of hydrogen by steam reforming (F. Basile at al., "JOURNAL OF CATALYSIS", 173, (1998) pages 247 to 256).

More specifically, in Japanese Patent Publication (KOKOKU) No. 48-13828(1973), Japanese Patent Application Laid-Open (KOKAI) No. 50-4001(1975), Japanese Patent Application Laid-Open (TOKUHYO) No. 2000-503624 and Japanese Patent Application Laid-Open (KOKAI) No. 11-276893(1999), there are described the catalysts containing magnesium, nickel and aluminum. However, since nickel is uniformly distributed over a whole portion of particles constituting these catalysts, a large amount of nickel is contained therein.

Meanwhile, in Japanese Patent Application Laid-Open (KOKAI) No. 11-276893(1999), it is described that the amount of metallic nickel carried on the catalyst is preferably 0.1 to 10% by weight. However, in the case where the amount of nickel carried is small, as described in Examples of Japanese Patent Publication (KOKOKU) No. 48-13828 (1973), the methane conversion percentage is less than 75% or less than 48% at a temperature of less than 800° C. and, therefore, is unsatisfactory.

In addition, in Japanese Patent Application Laid-Open (KOKAI) No. 2001-246257, there is described a catalyst for partial oxidation of methane, which is composed of a composite metal oxide produced by calcining calcium/aluminum-based laminar composite hydroxide particles containing nickel. However, since nickel is uniformly distributed over a whole portion of the laminar composite hydroxide particles, a large amount of nickel is contained therein.

Further, in the above technique proposed by F. Basile et al., the amount of Ni must be increased in order to attain good catalyst properties. As a result, there tend to be caused problems such as exhaustion of resources, expensiveness of resultant fuel cell system due to increase of catalyst unit cost and large amount of nickel used.

As a result of the present inventors' earnest studies for solving the above problems, it has been found that when composite particles obtained by heat-calcining composite hydroxide-type particles composed of composite hydroxide core particles containing magnesium and aluminum and a composite hydroxide layer containing magnesium, nickel and aluminum which is formed on the surface of the respective composite hydroxide core particles, thereby obtaining oxide particles, and then heat-reducing the thus obtained oxide particles to transform a nickel oxide contained in the oxide particles into fine metallic nickel particles, are used as a catalyst for decomposition of hydrocarbons, the catalyst can exhibit an extremely excellent anti-coking property even under a low steam atmosphere upon the production of hydrogen by steam-reforming of low-molecular hydrocarbons composed mainly of methane. The present invention has been attained based on the above finding.

SUMMARY OF THE INVENTION

An object of the present invention is to provide a catalyst for decomposition of hydrocarbons, which is capable of maintaining as small a particle size of metallic nickel particles as not more than 10 nm at a considerably reduced nickel content, and which exhibits an excellent anti-coking property even under a low steam atmosphere.

Another object of the present invention is to provide a catalyst for decomposition of hydrocarbons, which is capable of maintaining a methane conversion percentage of not less than 90% at a reaction temperature of 600 to 900° C., a ratio of steam to carbon (S/C) of 1.3 to 3.5 and a space velocity (GHSV) of 1,500 to 600,000 $h^{-1}$.

To accomplish the aim, in a first aspect of the present invention, there is provided a catalyst for decomposition of hydrocarbons, comprising porous oxide particles containing magnesium and aluminum, and fine metallic nickel particles which are present in the vicinity of surface of the respective porous oxide particles, and have an average particle diameter of 1 to 10 nm, said catalyst having a nickel content of 0.15 to 12% by weight based on the weight of the catalyst and a molar ratio of nickel to a sum of magnesium, nickel and aluminum of 0.001 to 0.12 in which a molar ratio of magnesium to aluminum (Mg:Al) is 4:1 to 1.5:1.

In a second aspect of the present invention, there is provided a catalyst for decomposition of hydrocarbons, having fine metallic nickel particles of an average particle diameter of 1 to 10 nm and a nickel content of 0.15 to 12% by weight based on the weight of the catalyst, which is produced by heat-calcining laminar composite hydroxide-type particles comprising composite hydroxide core particles containing magnesium and aluminum and a composite hydroxide layer containing magnesium, nickel and aluminum which is formed on surface of the respective composite hydroxide core particles, and then heat-reducing the obtained oxide particles to transform nickel oxide contained in the oxide particles into fine metallic nickel particles.

In a third aspect of the present invention, there is provided a process for producing the catalyst for decomposition of hydrocarbons as claimed in claim 1 or 4, comprising:

mixing an anion-containing aqueous alkali solution, an aqueous magnesium salt solution and an aqueous aluminum salt solution with each other;

after adjusting a pH value of the mixed solution to 9.0 to 14, aging the resultant mixed solution at a temperature of 60 to 250° C. to obtain a water suspension of composite hydroxide core particles containing magnesium and aluminum;

adding to the water suspension, an aqueous magnesium salt solution, an aqueous nickel salt solution and an aqueous aluminum salt solution, such that a molar ratio of a sum of magnesium, nickel and aluminum contained in these solutions to a sum of the magnesium and aluminum added upon production of the core particles is 0.05 to 0.45;

aging the resultant suspension at a pH value of 9.0 to 14 and a temperature of 60 to 250° C. to conduct a growth reaction for forming a laminar composite hydroxide coating layer on surface of the respective core particles, thereby obtaining laminar composite hydroxide particles;

heat-calcining the laminar composite hydroxide particles at a temperature of 450 to 1,700° C. to obtain oxide particles; and then heat-reducing the thus obtained oxide particles at a temperature of 700 to 1,000° C. under a reducing atmosphere.

In a fourth aspect of the present invention, there is provided a process for producing hydrogen by subjecting a gas composed mainly of low-molecular hydrocarbons to steam reforming, comprising contacting the gas composed mainly of low-molecular hydrocarbons and steam each other in the presence of a catalyst for decomposition of hydrocarbons as defined in the first or second aspect, at a temperature of 600 to 900° C., a molar ratio of steam to carbon (S/C) of 1.3 to 3.5 and a space velocity (GHSV) of 1,500 to 600,000 $h^{-1}$.

DETAILED DESCRIPTION OF THE INVENTION

The present invention is described in detail below.

First, the catalyst for decomposition of hydrocarbons according to the present invention is described.

The catalyst for decomposition of hydrocarbons according to the present invention comprises porous oxide particles containing magnesium and aluminum, and fine metallic nickel particles. In the present invention, the catalyst for decomposition of hydrocarbons is produced by heat-calcining a laminar composite hydroxide-type particle composed of a composite hydroxide core particle containing magnesium and aluminum and a composite hydroxide layer containing magnesium, nickel and aluminum, which is formed on the surface of the composite hydroxide core particle, and then heat-reducing the resultant calcined particle, and as a result, it is considered that nickel is not present in a central portion of the porous oxide particles constituting the catalyst for decomposition of hydrocarbons, and the fine metallic nickel particles are present merely in the vicinity of the surface of the respective porous oxide particles.

The fine metallic nickel particles contained in the catalyst for decomposition of hydrocarbons according to the present invention has an average particle diameter of 1 to 10 nm, preferably 1 to 8 nm. The catalyst for decomposition of hydrocarbons according to the present invention is optimum for production of hydrogen and exhibits an excellent anti-coking property. When the average particle diameter of the fine metallic nickel particles is more than 10 nm, the resultant catalyst tends to be deteriorated in anti-coking property.

The catalyst for decomposition of hydrocarbons according to the present invention has a metallic nickel content of 0.15 to 12% by weight, preferably 0.18 to 11% by weight based on the total weight of the catalyst. When the nickel content is less than 0.15% by weight, the resultant catalyst tends to be deteriorated in methane conversion percentage. When the nickel content is more than 12% by weight, the resultant catalyst tends to be deteriorated in anti-coking property due to increase in particle size of the fine metallic nickel particles.

The molar ratio of nickel to a sum of magnesium, nickel and aluminum contained in the catalyst for decomposition of hydrocarbons according to the present invention (Ni/(Mg+Ni+Al)) is usually 0.001 to 0.12, preferably 0.0012 to 0.10, more preferably 0.0015 to 0.08. When the molar ratio of Ni/(Mg+Ni+Al) is more than 0.12, the average particle diameter of the fine metallic nickel particles exceeds 10 nm, so that the resultant catalyst tends to be deteriorated in anti-coking property.

The molar ratio of magnesium to aluminum contained in the catalyst for decomposition of hydrocarbons according to the present invention, is not particularly restricted and is preferably large. As a result, the molar ratio of magnesium to aluminum (Mg:Al) is preferably in the range of 4:1 to 1.5:1. When the molar ratio of magnesium to aluminum exceeds the above-specified range, it may be difficult to readily obtain a molded product having a sufficient strength. When the molar ratio of magnesium to aluminum is less than the above-specified range, the resultant catalyst may fail to exhibit properties required as the porous carrier.

The catalyst for decomposition of hydrocarbons according to the present invention has a BET specific surface area value of usually 20 to 400 $m^2/g$, preferably 25 to 380 $m^2/g$. When the BET specific surface area value is less than 20 $m^2/g$, the methane conversion percentage tends to be deteriorated at a higher space velocity. When the BET specific surface area value is more than 400 $m^2/g$, it may be difficult to industrially produce the composite hydroxide as a precursor of the catalyst.

Next, the process for producing the catalyst for decomposition of hydrocarbons according to the present invention is described.

The catalyst for decomposition of hydrocarbons according to the present invention can be obtained by producing laminar composite hydroxide-type particles as a precursor thereof, heat-calcining the laminar composite hydroxide-type particles at a temperature of 450 to 1,700° C. to obtain porous oxide particles, and then heat-reducing the thus obtained porous oxide particles at a temperature of 700 to 1,000° C.

The laminar composite hydroxide-type particles used in the present invention are obtained by the following method. First, an anion-containing aqueous alkali solution, an aqueous magnesium salt solution and an aqueous aluminum salt solution are mixed with each other. After adjusting a pH value of the mixed solution to 9.0 to 14, the resultant mixed solution is subjected to reacting and aging treatments at a temperature of 50 to 250° C. to obtain composite hydroxide core particles. Then, an aqueous magnesium salt solution, an aqueous nickel salt solution and an aqueous aluminum salt solution are added to the resultant water suspension containing the composite hydroxide core particles in such an amount that a molar ratio of a sum of magnesium, nickel and aluminum contained in these aqueous solutions to a sum of the magnesium and aluminum added upon production of the core particles is 0.05 to 0.45. After adjusting the pH value of the obtained water suspension to 9.0 to 14, the water suspension is subjected to reacting and aging treatments at a temperature of 50 to 250° C. to conduct a growth reaction for topotactically forming a coating layer composed of magnesium, nickel and aluminum which are derived from the newly added aqueous solutions, on surface of the respective composite hydroxide core particles, thereby obtaining the laminar composite hydroxide-type particles.

When the pH value upon the reaction for production of the composite hydroxide core particles is less than 9.0, the growth of the composite hydroxide core particles tends to be insufficient, so that it may be difficult to conduct the subsequent growth reaction for forming the coating layer thereon. When the pH value upon the reaction for production of the composite hydroxide core particles is more than 14, the amount of aluminum eluted out is too large, thereby failing to obtain the aimed composition. The pH value upon the reaction for production of the composite hydroxide core particles is preferably 9.5 to 13, more preferably 10.0 to 12.5.

When the reaction temperature upon the reaction for production of the composite hydroxide core particles is less than 50° C., the growth of the composite hydroxide core particles is insufficient, so that it may be difficult to conduct the subsequent growth reaction for forming the coating layer thereon. When the reaction temperature upon the reaction for production of the composite hydroxide core particles is more than 250° C., impurities such as boehmite and gypsite in addition to the composite hydroxide of magnesium and aluminum tend to be mixed in the resultant particles, thereby failing to obtain the aimed composition. The reaction temperature upon the reaction for production of the composite hydroxide core particles is preferably 60 to 200° C., more preferably 60 to 190° C.

Although the aging time of the composite hydroxide core particles is not particularly restricted, the aging time is required to allow a sufficient growth of the composite hydroxide core particles. More specifically, the aging time of the composite hydroxide core particles is preferably 1.5 to 60 hours, more preferably 2 to 24 hours, still more preferably 2 to 12 hours. When the aging time is less than 1.5 hours, the growth of the composite hydroxide core particles tends to be insufficient. When the aging time is more than 60 hours, such a process tends to be disadvantageous from industrial viewpoints.

When the molar ratio of magnesium, nickel and aluminum added upon the growth reaction for forming the coating layer to a sum of magnesium and aluminum contained in the composite hydroxide core particles is less than 0.05, the resultant catalyst tends to be lowered in methane conversion percentage, thereby failing to attain the effects of the present invention. When the molar ratio of magnesium, nickel and aluminum added upon the growth reaction for forming the coating layer to a sum of magnesium and aluminum contained in the composite hydroxide core particles is more than 0.45, the average particle diameter of the fine metallic nickel particles contained in the obtained catalyst exceeds 10 nm, so that the catalyst tends to be deteriorated in anti-coking property. The molar ratio of magnesium, nickel and aluminum added upon the growth reaction for forming the coating layer to a sum of magnesium and aluminum contained in the composite hydroxide core particles is preferably 0.10 to 0.40, more preferably 0.12 to 0.38.

When the pH value upon the growth reaction for forming the coating layer is less than 9.0, the magnesium, nickel and aluminum added upon the growth reaction tends to be separated from the core particles and still dispersed in the water suspension without forming the coating layer thereon, thereby failing to obtain the aimed catalyst of the present invention. When the pH value upon the growth reaction for forming the coating layer is more than 14, the amount of aluminum eluted out tends to become too large, so that it may be difficult to obtain the aimed composition. The pH value upon the growth reaction for forming the coating layer is preferably 9.0 to 13.5, more preferably 9.5 to 13.5.

When the reaction temperature upon the growth reaction for forming the coating layer is less than 50° C., the magnesium, nickel and aluminum added upon the growth reaction tends to be separated from the core particles and still dispersed in the water suspension without forming the coating layer thereon, thereby failing to obtain the aimed catalyst of the present invention. When the reaction temperature upon the growth reaction for forming the coating layer is more than 250° C., impurities such as boehmite and gypsite in addition to the composite hydroxide of magnesium and aluminum tend to be mixed in the resultant particles, thereby failing to obtain the aimed composition. The reaction temperature upon the growth reaction for forming the coating layer is preferably 60 to 200° C., more preferably 60 to 190° C.

The aging time upon the growth reaction for forming the coating layer is not particularly restricted, and is preferably 1.5 to 60 hours, more preferably 2 to 24 hours, still more preferably 2 to 12 hours. When the aging time is less than 1.5 hours, the magnesium, nickel and aluminum added upon the growth reaction may fail to form a sufficient coating layer on the composite hydroxide core particles. When the aging time is more than 60 hours, such a process tends to be disadvantageous from industrial viewpoints.

Meanwhile, cobalt contained as impurity in the raw nickel material causes no significant problem even though the cobalt is mixed in the catalyst of the present invention.

The laminar composite hydroxide-type particles of the present invention have an average plate surface diameter of preferably 0.04 to 0.35 μm a crystallite size $D_{006}$ of preferably 0.0025 to 0.065 μm and a specific surface area value of preferably 5.0 to 250 m²/g. When the average plate surface diameter is less than 0.04 μm, it may be difficult to sufficiently filter out and water-wash the obtained particles, thereby failing to industrially produce the aimed catalyst. When the average plate surface diameter is more than 0.35 μm, it may be difficult to obtain a molded product of the catalyst from such particles. When the crystallite size $D_{006}$ is less than 0.0025 μm, the viscosity of the water suspension tends to be too high, thereby failing to industrially produce the aimed catalyst. When the crystallite size $D_{006}$ is more than 0.065 μm, it may be difficult to obtain a molded product of the catalyst from such particles. When the specific surface area value is less than 5.0 m²/g, it may be difficult to obtain a molded product of the catalyst from such particles. When the specific surface area value is more than 250 m²/g, the viscosity of the water suspension tends to be too high and as a result, it may be difficult to filter out and water-wash the obtained particles, thereby failing to industrially produce the aimed catalyst.

The laminar composite hydroxide-type particles of the present invention have a nickel content of preferably 0.25 to 12% by weight, more preferably 0.5 to 10% by weight based on the total weight of the laminar composite hydroxide-type particles. Also, the laminar composite hydroxide-type particles has such a nickel content that a molar ratio of nickel to a sum of magnesium, nickel and aluminum contained in the laminar composite hydroxide-type particles (Ni/(Mg+Ni+Al)) is preferably 0.001 to 0.12, more preferably 0.02 to 0.1, still more preferably 0.05 to 0.08. A molar ratio of magnesium to aluminum contained in the laminar composite hydroxide-type particles is not particularly restricted, and the molar ratio of magnesium to aluminum (Mg:Al) is preferably 4:1 to 1.5:1.

When the calcining temperature of the laminar composite hydroxide-type particles is less than 450° C., it may be difficult to produce the porous oxide particles. When the calcining temperature of the laminar composite hydroxide-type particles is more than 1,700° C., the obtained particles tend to be deteriorated in properties required as a porous carrier. The calcining temperature of the laminar composite hydroxide-type particles is preferably 500 to 1,700° C., more preferably 550 to 1,700° C.

The calcining time is not particularly restricted, and is usually 1 to 24 hours, preferably 1 to 12 hours. When the calcining time is more than 24 hours, it may be difficult to attain industrial merits.

The porous oxide particles of the present invention have an average plate surface diameter of preferably 0.05 to 0.35 μm and a BET specific surface area value of preferably 7.0 to 320 m²/g.

The porous oxide particles of the present invention preferably have a nickel content of preferably 0.25 to 12% by weight, more preferably 0.5 to 10% by weight based on the total weight of the porous oxide particles. Also, the porous oxide particles are substantially the same in nickel content and molar ratio of magnesium to aluminum as those in the laminar composite hydroxide-type particles.

When the reducing temperature of the porous oxide particles is less than 700° C., it may be difficult to reduce the nickel component into metallic nickel, thereby failing to obtain the aimed catalyst of the present invention. When the reducing temperature of the porous oxide particles is more than 1,000° C., the metallic nickel tends to suffer from sintering to increase the particle size of the fine metallic nickel particles, so that the resultant catalyst tends to be deteriorated in anti-coking property. The reducing temperature of the porous oxide particles is preferably 720 to 950° C. The atmosphere for reducing the porous oxide particles is not particularly restricted as long as a reducing atmosphere such as a hydrogen-containing gas is used. The heat-treating time is not particularly restricted, and is usually 0.5 to 24 hours, preferably 1 to 12 hours. When the heat-treating time is more than 24 hours, it may be difficult to attain industrial merits.

The thus obtained catalyst in the form of particles may be formed into various molded products according to applications thereof. The shape and size of the molded product is not particularly restricted, and the catalyst may be formed, for example, into a spherical shape, a cylindrical shape and a tubular shape, or may be coated onto a honeycomb member. The spherical, cylindrical or tubular molded product of the catalyst has a suitable size of usually about 0.1 to 10 mm. Also, various binders such as organic or inorganic compounds may be added to the molded product of the catalyst according to requirements in order to control a strength or a pore distribution density thereof. Further, in the present invention, the catalyst may be granulated and shaped before the calcination.

Next, the process for producing hydrogen using the catalyst for decomposition of hydrocarbons according to the present invention is described.

The process for producing hydrogen using the catalyst for decomposition of hydrocarbons according to the present invention, comprises contacting steam and a gas composed mainly of low-molecular hydrocarbons each other in the presence of the catalyst for decomposition of hydrocarbons according to the present invention, at a reaction temperature of 600 to 900° C., a molar ratio of steam to carbon (S/C) of 1.3 to 3.5 and a space velocity (GHSV) of 1,500 to 600,000 $h^{-1}$. In the process for producing hydrogen using the catalyst for decomposition of hydrocarbons according to the present invention, the catalyst exhibits a methane conversion percentage of not less than 90%.

When the reaction temperature upon production of hydrogen is less than 600° C., the methane conversion percentage tends to be lowered to not more than 90%, thereby failing to efficiently produce hydrogen. When the reaction temperature is more than 900° C., the low-molecular hydrocarbons such as methane tend to be decomposed. The reaction temperature upon production of hydrogen is preferably 630 to 880° C., more preferably 650 to 870° C.

When the molar ratio of steam to carbon (S/C) is less than 1.3, the catalyst tends to be deteriorated in anti-coking property. Further, when the molar ratio of steam to carbon (S/C) is less than 1, no sufficient reaction tends to be caused. When the molar ratio of steam to carbon (S/C) is more than 3.5, a large amount of steam is required to produce hydrogen, resulting in unpractical process due to increased costs. The molar ratio of steam to carbon (S/C) is preferably 1.35 to 3.3, more preferably 1.4 to 3.2. The space velocity (GHSV) is preferably 1,500 to 100,000 $h^{-1}$ in the consideration of application to actual apparatuses.

As the low-molecular hydrocarbon gas used for production of hydrogen, there may be preferably used hydrocarbons having usually 1 to 6 carbon atoms, preferably 1 to 4 carbon atoms. Examples of the low-molecular hydrocarbons may include, in addition to methane, ethane, propane, butane or the like.

The reason why the catalyst for decomposition of hydrocarbons according to the present invention can exhibit not only an excellent methane conversion percentage but also an excellent anti-coking property even at a less nickel content, is considered as follows.

That is, in the present invention, since the catalyst for decomposition of hydrocarbons is obtained by subjecting the laminar composite hydroxide-type particles composed of the composite hydroxide core particles containing magnesium and aluminum and a composite hydroxide layer containing magnesium, nickel and aluminum which is formed on the respective composite hydroxide core particles, to heat-calcination and then heat-reduction, it is considered that the fine metallic nickel particles are caused to efficiently exist only in the vicinity of the surface of the particle constituting the catalyst where the contact between the hydrocarbon gas and the catalyst more frequently occurs upon the decomposition reaction of hydrocarbons. In addition, it is considered that notwithstanding the nickel content in the whole particles can be minimized, a large amount of nickel is present in the vicinity of the surface of the respective particles constituting the catalyst, so that the amount of nickel present on the surface of the particles where the catalytic reaction is predominantly conducted, can be comparatively increased.

As described above, since the catalyst for decomposition of hydrocarbons according to the present invention exhibits a high catalytic activity, a high methane conversion percentage can be achieved even at a low reaction temperature, especially at about 600° C. Further, the catalyst can be prevented from suffering from coking, i.e., deposition of carbon thereon, upon the production of hydrogen and, therefore, can maintain a high catalytic activity even under a low steam condition.

Thus, in the catalyst for decomposition of hydrocarbons according to the present invention, the nickel content thereof is minimized and the fine metallic nickel particles functioned as the catalyst have a particle size as small as not more than 10 nm. Therefore, the catalyst can be applied to a broad range of catalytic reactions, especially can maintain a high anti-coking property even under a low steam condition, and can be used to produce hydrogen from a low-molecular hydrocarbon gas at a high conversion percentage.

Further, the catalyst for decomposition of hydrocarbons according to the present invention can be used as catalysts for carbon dioxide-reforming or partial oxidation of low-molecular hydrocarbon gas, or the like.

EXAMPLES

The present invention is described in more detail by Examples and Comparative Examples, but the Examples are only illustrative and, therefore, not intended to limit the scope of the present invention.

Various properties were evaluated by the following methods.

(1) The plate surface diameter of the laminar composite hydroxide-type particles and porous oxide particles was expressed by an average of values measured from a micrograph thereof.

(2) The thickness of the laminar composite hydroxide-type particles was expressed by the value calculated from a diffraction peak curve of (006) crystal plane of the composite hydroxide particles according to the Scherrer's formula using a X-ray Diffractometer "RINT 2500" (manufactured by Rigaku Denki Co., Ltd.; tube: Cu; tube voltage: 40 kV; tube current: 300 mA; goniometer: wide-angle goniometer; sampling width: 0.0200; scanning speed: 2°/min; emitting slit: 1°; scattering slit: 1°; light-receiving slit: 0.50 nm).

(3) The laminar composite hydroxide particles were identified by X-ray diffraction measurement using the same X-ray diffractometer as used in the above (2) at a diffraction angle $2\theta$ of 3 to 80°.

(4) The amounts of magnesium, nickel and aluminum contained in the catalyst were determined by measuring contents of these elements in a solution prepared by dissolving the catalyst with an acid, using an inductively coupled high-frequency plasma atomic emission spectroscopic device "SPS-4000 Model" (manufactured by Seiko Denshi Kogyo Co., Ltd.).

(5) The size of the fine metallic nickel particles was expressed by an average of values measured from a micrograph thereof. Further, the size of the fine metallic nickel particles having a diameter of more than 10 nm was expressed by the value calculated from a diffraction peak curve of (200) crystal plane of the fine metallic nickel particles according to the Scherrer's formula using a X-ray Diffractometer "RINT 2500" (manufactured by Rigaku Denki Co., Ltd.; tube: Cu; tube voltage: 40 kV; tube current: 300 mA; goniometer: wide-angle goniometer; sampling width: 0.020°; scanning speed: 2°/min; emitting slit: 1°; scattering slit: 1°; light-receiving slit: 0.50 nm). It was recognized that the size of the fine metallic nickel particles as measured by the X-ray diffractometer was the same as that measured from the micrograph.

(6) The specific surface area value was expressed by the value measured by B.E.T. method using nitrogen.

(7) The methane conversion percentage was calculated from the following formula:

Methane conversion percentage (%) =

{10(methane concentration at outlet)/(methane concentration at inlet)} × 100

(8) The amount of carbon deposited on the catalyst after the production of hydrogen was measured using a carbon-sulfur measuring device.

Example 1

<Production of Catalyst>

170.9 g of $Mg(NO_3)_2.6H_2O$ and 41.68 g of $Al(NO_3)_3.9H_2O$ were dissolved in water to prepare 1,000 ml of an aqueous solution of the magnesium and aluminum salts. Separately, 1,000 ml of an aqueous solution prepared by dissolving 17.46 g of $NaCO_3$ in water was added to 129 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 60° C. for 2 hours to obtain composite hydroxide core particles. The pH value of the resultant reaction solution was 10.3. Then, 500 ml of a mixed solution containing 115.4 g of $Mg(NO_3)_2.6H_2O$, 17.11 g of $Ni(NO_3).6H_2O$ and 2.452 g of $Al(NO_3)_3.9H_2O$ was added to the resultant alkaline suspension to adjust the pH value of the reaction solution to 9.5. The reaction solution was further aged at 60° C. for 2 hours to topotactically grow a coating layer on the composite hydroxide core particles, thereby obtaining laminar composite hydroxide-type particles. Meanwhile, the molar ratio of a sum of magnesium, nickel and aluminum added upon the growth reaction to a sum of magnesium and aluminum added upon the production of the core particles was 0.125. As a result, it was confirmed that the thus obtained laminar composite hydroxide-type particles had an average plate surface diameter of 0.05 μm, a crystallite size $D_{006}$ of 0.011 μm, a BET specific surface area of 208 $m^2/g$ and a nickel content of 4.6% by weight.

The obtained laminar composite hydroxide-type particles were molded into spherical beads having a diameter of 3 mm. The thus molded spherical beads were calcined in air at 750° C. for 3 hours to produce porous oxide particles. It was confirmed that the thus obtained porous oxide particles had an average plate surface diameter of 0.06 μm, a BET specific surface area of 288 $m^2/g$ and a nickel content of 8.0% by weight.

Next, the obtained porous oxide particles were reduced at 770° C. for one hour in a gas flow containing hydrogen and argon at a volume ratio of 20:80, thereby obtaining a catalyst for decomposition of hydrocarbons. As a result, it was confirmed that the thus obtained catalyst had a nickel content of 8.2% by weight, a molar ratio of nickel to a sum of magnesium, nickel and aluminum (Ni/(Mg+Ni+Al)) of 0.0581, a molar ratio of magnesium to aluminum (Mg:Al) of 3:1 and a BET specific surface area of 365 $m^2/g$, and the fine metallic nickel particles contained therein had a particle diameter of 7 nm.

<Hydrogen Production Reaction Using the Catalyst>

In order to evaluate properties of the above obtained catalyst, 20 to 50 g of the catalyst was filled in a stainless steel reactor having an diameter of 20 mm, thereby preparing a catalyst tube.

The thus prepared catalyst tube (reactor) was filled with a nitrogen gas and closely sealed. Then, after heating the sealed catalyst tube to each reaction temperature (600 to 900° C.) at a temperature rise rate of 20° C./min, steam was flowed through the tube for 15 minutes. Fifteen minutes after initiation of flowing the steam, a city gas having a composition 13A (compressed natural gas containing 87.5% by volume of methane, 7.4% by volume of ethane and 2% by volume of propane) was additionally flowed through the tube. At that time, the reaction pressure was 0.5 MPa, the space velocity (GHSV) of the city gas was 2,500 $h^{-1}$ (or 10,000 $h^{-1}$), and the molar ratio of steam to carbon (S/C) was 1.8 and 2.5.

Example 2

The composite hydroxide produced by the same method as defined in Example 1 was molded into spherical beads having a diameter of 2.5 mm. The thus molded spherical beads were calcined in air at 1,200° C. for 30 minutes, thereby obtaining porous oxide particles. It was confirmed that the thus obtained porous oxide particles had an average plate surface diameter of 0.15 μm, a BET specific surface area of 167 $m^2/g$ and a nickel content of 8.0% by weight.

Next, the obtained porous oxide particles were reduced at 850° C. for one hour in a gas flow containing hydrogen and argon at a volume ratio of 20:80, thereby obtaining a catalyst for decomposition of hydrocarbons. As a result, it was confirmed that the thus obtained catalyst had a nickel content of 8.2% by weight, a molar ratio of nickel to a sum of magnesium, nickel and aluminum (Ni/(Mg+Ni+Al)) of 0.0581, a molar ratio of magnesium to aluminum (Mg:Al) of 3:1 and a BET specific surface area of 182 $m^2/g$, and the fine metallic nickel particles contained therein had a particle diameter of 8 nm.

Example 3

The substantially same procedure as defined in Example 1 was conducted as follows. That is, 153.9 g of $Mg(NO_3)_2.6H_2O$ and 37.51 g of $Al(NO_3)_3.9H_2O$ were dissolved in water to prepare an aqueous solution of the magnesium and aluminum salts. Separately, 1,000 ml of an aqueous solution prepared by dissolving 14.62 g of $NaCO_3$ in water was added to 366 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 60 for 2 hours to obtain composite hydroxide core particles. The pH value of the resultant reaction solution was 12.6. Then, 500 ml of a mixed solution containing 32.05 g of $Mg(NO_3)_2.6H_2O$, 9.693 g of $Ni(NO_3).6H_2O$ and 7.815 g of $Al(NO_3)_3.9H_2O$ was added to the resultant alkaline suspension to adjust the pH value of the reaction solution to 11.2. The reaction solution was further aged at 95° C. for 6 hours to topotactically grow a coating layer on the composite hydroxide core particles, thereby obtaining laminar composite hydroxide-type particles. Meanwhile, the molar ratio of a sum of magnesium, nickel and aluminum added upon the growth reaction to a sum of magnesium and aluminum added upon the production of the core particles was 0.25. As a result, it was confirmed that the thus obtained laminar composite hydroxide-type particles had an average plate surface diameter of 0.3 μm, a crystallite size $D_{006}$ of 0.021 μm, a BET specific surface area of 17 m$^2$/g and a nickel content of 2.7% by weight.

The obtained laminar composite hydroxide-type particles were molded into spherical beads having a diameter of 3 mm. The thus molded spherical beads were calcined in air at 1,000° C. for 30 minutes to produce porous oxide particles. It was confirmed that the thus obtained porous oxide particles had an average plate surface diameter of 0.32 μm, a BET specific surface area of 121 m$^2$/g and a nickel content of 4.4% by weight.

Next, the obtained porous oxide particles were reduced at 800° C. for 2 hours in a gas flow containing hydrogen and argon at a volume ratio of 20:80, thereby obtaining a catalyst in the form of particles. As a result, it was confirmed that the thus obtained catalyst had a nickel content of 4.5% by weight, a molar ratio of nickel to a sum of magnesium, nickel and aluminum (Ni/(Mg+Ni+Al)) of 0.0333, a molar ratio of magnesium to aluminum (Mg:Al) of 3.9:1 and a BET specific surface area of 185 m$^2$/g, and the fine metallic nickel particles contained therein had a particle diameter of 8 nm.

Example 4

The substantially same procedure as defined in Example 1 was conducted as follows. That is, 174.8 g of Mg(NO$_3$)$_2$.6H$_2$O and 42.63 g of Al(NO$_3$)$_3$.9H$_2$O were dissolved in water to prepare an aqueous solution containing the magnesium and aluminum salts. Separately, 1,000 ml of an aqueous solution prepared by dissolving 18.51 g of NaCO$_3$ in water was added to 366 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 60 for 2 hours to obtain composite hydroxide core particles. The pH value of the resultant reaction solution was 11.5. Then, 500 ml of a mixed solution containing 17.14 g of Mg(NO$_3$)$_2$.6H$_2$O, 0.518 g of Ni(NO$_3$).6H$_2$O and 4.179 g of Al(NO$_3$)$_3$.9H$_2$O was added to the resultant alkaline suspension to adjust the pH value of the reaction solution to 10.7. The reaction solution was further aged at 70° C. for 6 hours, thereby obtaining laminar composite hydroxide-type particles as a precursor of the aimed catalyst. Meanwhile, the molar ratio of a sum of magnesium, nickel and aluminum added upon the growth reaction to a sum of magnesium and aluminum added upon the production of the core particles was 0.333. As a result, it was confirmed that the thus obtained laminar composite hydroxide-type particles had an average plate surface diameter of 0.15 μm, a crystallite size $D_{006}$ of 0.032 μm, a BET specific surface area of 45 m$^2$/g and a nickel content of 0.12% by weight.

The obtained laminar composite hydroxide-type particles as a particulate precursor of the catalyst were molded into spherical beads having a diameter of 3 mm. The thus molded spherical beads were calcined in air at 950° C. for 2 hours to produce porous oxide particles. It was confirmed that the thus obtained porous oxide particles had an average plate surface diameter of 0.17 μm, a BET specific surface area of 189 m$^2$/g and a nickel content of 0.19% by weight.

Next, the obtained porous oxide particles were reduced at 750° C. for one hour in a gas flow containing hydrogen and argon at a volume ratio of 20:80, thereby obtaining a catalyst in the form of particles. As a result, it was confirmed that the thus obtained catalyst had a nickel content of 0.2% by weight, a molar ratio of nickel to a sum of magnesium, nickel and aluminum (Ni/(Mg+Ni+Al)) of 0.0019, a molar ratio of magnesium to aluminum (Mg:Al) of 2.5:1 and a BET specific surface area of 212 m$^2$/g, and the fine metallic nickel particles contained therein had a particle diameter of 1 nm.

Example 5

The substantially same procedure as defined in Example 1 was conducted as follows. That is, 128.2 g of Mg(NO$_3$)$_2$.6H$_2$O and 31.26 g of Al(NO$_3$)$_3$.9H$_2$O were dissolved in water to prepare an aqueous solution containing the magnesium and aluminum salts. Separately, 1,000 ml of an aqueous solution prepared by dissolving 18.49 g of NaCO$_3$ in water was added to 375 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 95° C. for 2 hours to obtain composite hydroxide core particles. The pH value of the resultant reaction solution was 13.9. Then, 500 ml of a mixed solution containing 63.47 g of Mg(NO$_3$)$_2$.6H$_2$O, 0.96 g of Ni(NO$_3$).6H$_2$O and 15.48 g of Al(NO$_3$)$_3$.9H$_2$O was added to the resultant alkaline suspension to adjust the pH value of the reaction solution to 12.7. The reaction solution was further aged at 95° C. for 6 hours, thereby obtaining laminar composite hydroxide-type particles as a precursor of the aimed catalyst. Meanwhile, the molar ratio of a sum of magnesium, nickel and aluminum added upon the growth reaction to a sum of magnesium and aluminum added upon the production of the core particles was 0.5. As a result, it was confirmed that the thus obtained laminar composite hydroxide-type particles had an average plate surface diameter of 0.35 μm a crystallite size $D_{006}$ of 0.0542 μm, a BET specific surface area of 10 m$^2$/g and a nickel content of 0.22% by weight.

The obtained laminar composite hydroxide-type particles were molded into spherical beads having a diameter of 3 mm. The thus molded spherical beads were calcined in air at 900° C. for 2 hours to produce porous oxide particles. It was confirmed that the thus obtained porous oxide particles had an average plate surface diameter of 0.35 μm, a BET specific surface area of 42 m$^2$/g and a nickel content of 0.48% by weight.

Next, the obtained porous oxide particles were reduced at 770° C. for 2 hours in a gas flow containing hydrogen and argon at a volume ratio of 20:80, thereby obtaining a catalyst in the form of particles. As a result, it was confirmed that the thus obtained catalyst had a nickel content of 0.5% by weight, a molar ratio of nickel to a sum of magnesium, nickel and aluminum (Ni/(Mg+Ni+Al)) of 0.0033, a molar ratio of magnesium to aluminum (Mg:Al) of 2:1 and a BET specific surface area of 83 m$^2$/g, and the fine metallic nickel particles contained therein had a particle diameter of 2 nm.

Example 6

The substantially same procedure as defined in Example 1 was conducted as follows. That is, 153.9 g of Mg(NO$_3$)$_2$.6H$_2$O and 37.51 g of Al(NO$_3$)$_3$.9H$_2$O were dissolved in water to prepare an aqueous solution containing the magnesium and aluminum salts. Separately, 1,000 ml of an aqueous solution prepared by dissolving 18.31 g of NaCO$_3$ in water was added to 112 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 60° C. for 2 hours to obtain composite hydroxide core particles. The pH value of the resultant reaction solution was 10.1. Then, 500 ml of a mixed solution containing 35.86 g of Mg(NO$_3$)$_2$.6H$_2$O, 3.983 g of Ni(NO$_3$).6H$_2$O and 8.744 g of Al(NO$_3$)$_3$.9H$_2$O was added to the resultant alkaline suspension to adjust the pH value of the reaction solution to 8.7. The reaction solution was further aged at 60° C. for 2 hours, thereby obtaining laminar composite hydroxide-type particles as a precursor of the aimed catalyst. Meanwhile, the molar ratio of a sum of magnesium, nickel and aluminum added upon the growth reaction to a sum of magnesium and aluminum added upon the production of the core particles was 0.25. As a result, it was confirmed that the thus obtained laminar composite hydroxide-type particles had an average plate surface diameter of 0.08 μm a crystallite size D$_{006}$ of 0.0224 μm, a BET specific surface area of 243 m$^2$/g and a nickel content of 1.1% by weight.

The obtained laminar composite hydroxide-type particles were molded into spherical beads having a diameter of 3 mm. The thus molded spherical beads were calcined in air at 800° C. for 3 hours to produce porous oxide particles. It was confirmed that the thus obtained porous oxide particles had an average plate surface diameter of 0.12 μm, a BET specific surface area of 314 m$^2$/g and a nickel content of 1.76% by weight.

Next, the obtained porous oxide particles were reduced at 850° C. for one hour in a gas flow containing hydrogen and argon at a volume ratio of 20:80, thereby obtaining a catalyst in the form of particles. As a result, it was confirmed that the thus obtained catalyst had a nickel content of 1.8% by weight, a molar ratio of nickel to a sum of magnesium, nickel and aluminum (Ni/(Mg+Ni+Al)) of 0.014, a molar ratio of magnesium to aluminum (Mg:Al) of 1.6:1 and a BET specific surface area of 384 m$^2$/g, and the fine metallic nickel particles contained therein had a particle diameter of 4 nm.

Example 7

The substantially same procedure as defined in Example 1 was conducted as follows. That is, 153.9 g of Mg(NO$_3$)$_2$.6H$_2$O and 37.51 g of Al(NO$_3$)$_3$.9H$_2$O were dissolved in water to prepare an aqueous solution containing the magnesium and aluminum salts. Separately, 1,000 ml of an aqueous solution prepared by dissolving 18.46 g of NaCO$_3$ in water was added to 260 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 60° C. for 2 hours to obtain composite hydroxide core particles. The pH value of the resultant reaction solution was 11.6. Then, 500 ml of a mixed solution containing 37.52 g of Mg(NO$_3$)$_2$.6H$_2$O, 1.418 g of Ni(NO$_3$).6H$_2$O and 9.150 g of Al(NO$_3$)$_3$.9H$_2$O was added to the resultant alkaline suspension to adjust the pH value of the reaction solution to 10.3. The reaction solution was further aged at 95° C. for 6 hours, thereby obtaining laminar composite hydroxide-type particles as a precursor of the aimed catalyst. Meanwhile, the molar ratio of a sum of magnesium, nickel and aluminum added upon the growth reaction to a sum of magnesium and aluminum added upon the production of the core particles was 0.25. As a result, it was confirmed that the thus obtained laminar composite hydroxide-type particles had an average plate surface diameter of 0.13 μm a crystallite size D$_{006}$ of 0.0252 μm, a BET specific surface area of 52 m$^2$/g and a nickel content of 0.3% by weight.

The obtained laminar composite hydroxide-type particles were molded into spherical beads having a diameter of 3 mm. The thus molded spherical beads were calcined in air at 900° C. for 2 hours to produce porous oxide particles. It was confirmed that the thus obtained porous oxide particles had an average plate surface diameter of 0.18 μm, a BET specific surface area of 165 m$^2$/g and a nickel content of 0.68% by weight.

Next, the obtained porous oxide particles were reduced at 720° C. for one hour in a gas flow containing hydrogen and argon at a volume ratio of 20:80, thereby obtaining a catalyst in the form of particles. As a result, it was confirmed that the thus obtained catalyst had a nickel content of 0.7% by weight, a molar ratio of nickel to a sum of magnesium, nickel and aluminum (Ni/(Mg+Ni+Al)) of 0.0049, a molar ratio of magnesium to aluminum (Mg:Al) of 2.3:1 and a BET specific surface area of 231 m$^2$/g, and the fine metallic nickel particles contained therein had a particle diameter of 2 nm.

Example 8

121.9 g of MgCl$_2$.6H$_2$O and 25.24 g of AlCl$_3$.6H$_2$O were dissolved in pure water to prepare 1000 ml of an aqueous solution containing the magnesium and aluminum salts. Separately, 1,000 ml of an aqueous solution prepared by dissolving 18.56 g of NaCO$_3$ in water was added to 393 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 90° C. for 7 hours to obtain composite hydroxide core particles. The pH value of the resultant reaction solution was 13.9. Then, 500 ml of a mixed solution containing 18.55 g of MgCl$_2$.6H$_2$O, 17.37 g of NiCl$_2$.6H$_2$O and 3.624 g of AlCl$_3$.6H$_2$O was added to the resultant alkaline suspension to adjust the pH value of the reaction solution to 13.1. The reaction solution was further aged at 95° C. for 8 hours, thereby obtaining laminar composite hydroxide-type particles as a precursor of the aimed catalyst. Meanwhile, the molar ratio of a sum of magnesium, nickel and aluminum added upon the growth reaction to a sum of magnesium and aluminum added upon the production of the core particles was 0.25. As a result, it was confirmed that the thus obtained laminar composite hydroxide-type particles had an average plate surface diameter of 0.24 μm, a crystallite size D$_{006}$ of 0.0472 μm, a BET specific surface area of 18.2 m$^2$/g and a nickel content of 5.8% by weight.

The obtained laminar composite hydroxide-type particles were molded into spherical beads having a diameter of 3 mm. The thus molded spherical beads were calcined in air at 700° C. for 10 hours to produce porous oxide particles. It was confirmed that the thus obtained porous oxide particles had an average plate surface diameter of 0.29 μm, a BET specific surface area of 102 m$^2$/g and a nickel content of 10.2% by weight.

Next, the obtained porous oxide particles were reduced at 900° C. for 30 minutes in a gas flow containing hydrogen and argon at a volume ratio of 20:80, thereby obtaining a catalyst in the form of particles. As a result, it was confirmed that the thus obtained catalyst had a nickel content of 10.5% by weight, a molar ratio of nickel to a sum of magnesium, nickel and aluminum (Ni/(Mg+Ni+Al)) of 0.0746, a molar ratio of magnesium to aluminum (Mg:Al) of 3:1 and a BET specific surface area of 174 m$^2$/g, and the fine metallic nickel particles contained therein had a particle diameter of 6 nm.

Example 9

121.9 g of MgCl$_2$.6H$_2$O and 25.24 g of AlCl$_3$.6H$_2$O were dissolved in pure water to prepare 1000 ml of an aqueous solution containing the magnesium and aluminum salts. Separately, 1,000 ml of an aqueous solution prepared by dissolving 18.56 g of NaCO$_3$ in water was added to 393 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 90° C. for 10 hours to obtain composite hydroxide core particles. The pH value of the resultant reaction solution was 13.9. Then, 500 ml of a mixed solution containing 18.55 g of MgCl$_2$.6H$_2$O, 17.37 g of NiCl$_2$.6H$_2$O and 3.624 g of AlCl$_3$.6H$_2$O was added to the resultant alkaline suspension to adjust the pH value of the reaction solution to 13.1. The reaction solution was further aged at 180 for 12 hours, thereby obtaining laminar composite hydroxide-type particles as a precursor of the aimed catalyst. Meanwhile, the molar ratio of a sum of magnesium, nickel and aluminum added upon the growth reaction to a sum of magnesium and aluminum added upon the production of the core particles was 0.25. As a result, it was confirmed that the thus obtained laminar composite hydroxide-type particles had an average plate surface diameter of 0.35 μm, a crystallite size D$_{006}$ of 0.0624 μm, a BET specific surface area of 8 m$^2$/g and a nickel content of 5.8% by weight.

The obtained laminar composite hydroxide-type particles as a particulate precursor of the catalyst were molded into spherical beads having a diameter of 3 mm. The thus molded spherical beads were calcined in air at 1,400° C. for 30 minutes to produce porous oxide particles. It was confirmed that the thus obtained porous oxide particles had an average plate surface diameter of 0.35 μm, a BET specific surface area of 18 m$^2$/g and a nickel content of 10.2% by weight.

Next, the obtained porous oxide particles were reduced at 720° C. for 12 hours in a gas flow containing hydrogen and argon at a volume ratio of 20:80, thereby obtaining a catalyst in the form of particles. As a result, it was confirmed that the thus obtained catalyst had a nickel content of 10.5% by weight, a molar ratio of nickel to a sum of magnesium, nickel and aluminum (Ni/(Mg+Ni+Al)) of 0.0746, a molar ratio of magnesium to aluminum (Mg:Al) of 3:1 and a BET specific surface area of 53 m$^2$/g, and the fine metallic nickel particles contained therein had a particle diameter of 7 nm.

REFERENCE EXAMPLE 160.3 g of Mg(NO$_3$)$_2$.6H$_2$O, 39.08 g of Al(NO$_3$)$_3$.9H$_2$O and 48.47 g of Ni(NO$_3$).6H$_2$O were dissolved in pure water to prepare 1000 ml of an aqueous solution containing the magnesium and aluminum salts. Separately, 1,000 ml of an aqueous solution prepared by dissolving 15.46 g of NaCO$_3$ in water was added to 298 ml of NaOH (concentration: 14 mol/liter) to prepare a mixed alkali solution having a total volume of 2,000 ml. The thus prepared mixed alkali solution was mixed with the above prepared solution containing the magnesium and the aluminum salts, and the obtained solution was aged at 98° C. for 24 hours to obtain composite hydroxide core particles as a catalyst precursor. As a result, it was confirmed that the thus obtained laminar composite hydroxide particles had an average plate surface diameter of 0.26 μm, a crystallite size D$_{006}$ of 0.0463 μm, a BET specific surface area of 18.5 m$^2$/g and a nickel content of 12.1% by weight.

Successively, the obtained catalyst precursor in the form of particles was molded into spherical beads having a diameter of 3 mm. The thus molded spherical beads were calcined in air at 1,000° C. for 2 hours to produce porous oxide particles. It was confirmed that the thus obtained porous oxide particles had an average plate surface diameter of 0.33 μm, a BET specific surface area of 92 m$^2$/g and a nickel content of 21.0% by weight.

Next, the obtained porous oxide particles were reduced at 800° C. for 2 hours in a gas flow containing hydrogen and argon at a volume ratio of 20:80, thereby obtaining a catalyst in the form of particles. As a result, it was confirmed that the thus obtained catalyst had a nickel content of 21.5% by weight, a molar ratio of nickel to a sum of magnesium, nickel and aluminum (Ni/(Mg+Ni+Al)) of 0.1861, a molar ratio of magnesium to aluminum (Mg:Al) of 3:1 and a BET specific surface area of 109 m$^2$/g, and the fine metallic nickel particles contained therein had a particle diameter of 14 nm.

COMPARATIVE EXAMPLE

α-Al$_2$O$_3$ particles were molded into spherical beads having a diameter of 2.7 mm. The thus molded spherical beads were calcined in air at 970° C. for 8 hours. The calcined spherical beads were sprayed with 1,000 ml of a solution prepared by dissolving 182.4 g of nickel nitrate hexahydrate, dried and then calcined again in air at 750° C. for 3 hours. The resultant product was reduced at 800° C. for one hour in a gas flow containing hydrogen and argon at a volume ratio of 20:80, thereby obtaining a catalyst. As a result, it was confirmed that the thus obtained catalyst had a nickel content of 8.8% by weight, a molar ratio of nickel to a sum of magnesium, nickel and aluminum (Ni/(Mg+Ni+Al)) of 0.0811 and a BET specific surface area of 2.2 m$^2$/g, and the fine metallic nickel particles contained therein had a particle diameter of 46 nm.

<Hydrogen Production Reaction Using the Catalyst>

The same procedure for hydrogen production reaction using the catalyst as defined in Example 1 was conducted except that the kind of catalyst was variously changed.

The results of the reactions are shown in Tables 1 to 4. In Table 1, there is shown the change in methane conversion percentage at a space velocity (GHSV) at 2,500 h$^{-1}$ when the hydrogen production reaction was conducted at the respective reaction temperatures. In Table 2, there is shown the change in methane conversion percentage at a space velocity (GHSV) at 10,000 h$^{-1}$ when the hydrogen production reaction was conducted at the respective reaction temperatures. In Table 3, there is shown a relationship between reacting time and methane conversion percentage at 700° C. In Table 4, there is shown a relationship between reacting time and amount of carbon deposited on the catalyst molded product at 700° C.

TABLE 1

Change in $CH_4$ conversion percentage depending upon reaction temperature (at GHSV = 2,500 h$^{-1}$)

| | Composition of catalyst | Reaction temperature (° C.) | CH$_4$ conversion percentage (%) S/C = 1.8 | S/C = 2.5 |
|---|---|---|---|---|
| Examples | | | | |
| Example 1 | Ni/(Mg + Al + Ni) 0.058 mol (Ni: 8.0 wt %) | 600 | 90.5 | 91.2 |
| | | 650 | 91.0 | 92.1 |
| | | 700 | 93.1 | 95.5 |
| | | 750 | 94.3 | 96.3 |
| | | 800 | 95.2 | 97.4 |
| | | 850 | 96.4 | 97.5 |
| | | 900 | 96.9 | 98.1 |
| Example 2 | Ni/(Mg + Al + Ni) 0.058 mol (Ni: 8.0 wt %) | 600 | 90.3 | 90.8 |
| | | 650 | 90.8 | 91.8 |
| | | 700 | 93.5 | 94.5 |
| | | 750 | 94.6 | 96.6 |
| | | 800 | 95.5 | 96.9 |
| | | 850 | 95.9 | 97.3 |
| | | 900 | 96.8 | 98.5 |
| Example 3 | Ni/(Mg + Al + Ni) 0.033 mol (Ni: 4.5 wt %) | 600 | 90.2 | 90.1 |
| | | 650 | 90.6 | 90.2 |
| | | 700 | 90.9 | 92.4 |
| | | 750 | 92.5 | 94.3 |
| | | 800 | 93.8 | 95.7 |
| | | 850 | 95.2 | 96.1 |
| | | 900 | 96.2 | 97.9 |
| Example 4 | Ni/(Mg + Al + Ni) 0.0019 mol (Ni: 0.2 wt %) | 600 | 90.2 | 90.3 |
| | | 650 | 90.3 | 90.4 |
| | | 700 | 90.6 | 91.5 |
| | | 750 | 91.1 | 93.4 |
| | | 800 | 92.1 | 94.7 |
| | | 850 | 93.3 | 94.9 |
| | | 900 | 94.2 | 96.1 |
| Example 5 | Ni/(Mg + Al + Ni) 0.003 mol (Ni: 0.5 wt %) | 600 | 90.1 | 90.4 |
| | | 650 | 90.4 | 90.6 |
| | | 700 | 90.8 | 91.8 |
| | | 750 | 91.2 | 92.5 |
| | | 800 | 92.7 | 93.7 |
| | | 850 | 93.6 | 94.6 |
| | | 900 | 94.9 | 96.4 |
| Example 6 | Ni/(Mg + Al + Ni) 0.014 mol (Ni: 1.8 wt %) | 600 | 90.4 | 90.3 |
| | | 650 | 90.5 | 90.9 |
| | | 700 | 90.7 | 91.5 |
| | | 750 | 91.1 | 92.9 |
| | | 800 | 93.2 | 93.1 |
| | | 850 | 93.9 | 94.3 |
| | | 900 | 95.1 | 96.8 |
| Example 7 | Ni/(Mg + Al + Ni) 0.0049 mol (Ni: 0.7 wt %) | 600 | 90.1 | 90.1 |
| | | 650 | 90.1 | 90.2 |
| | | 700 | 90.5 | 91.1 |
| | | 750 | 92.1 | 93.1 |
| | | 800 | 93.2 | 94.2 |
| | | 850 | 93.9 | 94.8 |
| | | 900 | 94.9 | 95.9 |
| Example 8 | Ni/(Mg + Al + Ni) 0.0746 mol (Ni: 10.2 wt %) | 600 | 90.1 | 90.5 |
| | | 650 | 91.2 | 92.8 |
| | | 700 | 92.9 | 94.7 |
| | | 750 | 93.3 | 96.9 |
| | | 800 | 94.8 | 97.4 |
| | | 850 | 96.1 | 97.9 |
| | | 900 | 97.3 | 98.8 |

TABLE 1-continued

Change in $CH_4$ conversion percentage depending upon reaction temperature (at GHSV = 2,500 h$^{-1}$)

| | Composition of catalyst | Reaction temperature (° C.) | CH$_4$ conversion percentage (%) S/C = 1.8 | S/C = 2.5 |
|---|---|---|---|---|
| Examples, Reference Example and Comparative Example | | | | |
| Example 9 | Ni/(Mg + Al + Ni) 0.0746 mol (Ni: 10.2 wt %) | 600 | 90.2 | 91.3 |
| | | 650 | 91.4 | 92.2 |
| | | 700 | 92.6 | 93.8 |
| | | 750 | 93.5 | 95.2 |
| | | 800 | 95.2 | 96.7 |
| | | 850 | 96.4 | 97.1 |
| | | 900 | 97.7 | 98.2 |
| Reference Example | Ni/(Mg + Al + Ni) 0.1861 mol (Ni: 21.5 wt %) | 600 | 81.1 | 82.1 |
| | | 650 | 85.2 | 86.2 |
| | | 700 | 87.4 | 87.3 |
| | | 750 | 89.1 | 88.9 |
| | | 800 | 92.1 | 92.3 |
| | | 850 | 92.4 | 92.3 |
| | | 900 | 92.5 | 92.4 |
| Comparative Example | Ni/(α-Al$_2$O$_3$ + Ni) 0.081 mol (Ni: 8.8 wt %) | 600 | 85.4 | 87.2 |
| | | 650 | 90.4 | 90.2 |
| | | 700 | 91.3 | 92.5 |
| | | 750 | 92.8 | 93.4 |
| | | 800 | 94.1 | 95.3 |
| | | 850 | 94.9 | 95.8 |
| | | 900 | 95.8 | 96.1 |

TABLE 2

Change in $CH_4$ conversion percentage depending upon reaction temperature (at GHSV = 10,000 h$^{-1}$)

| | Composition of catalyst | Reaction temperature (° C.) | CH$_4$ conversion percentage (%) S/C = 1.8 | S/C = 2.5 |
|---|---|---|---|---|
| Examples | | | | |
| Example 1 | Ni/(Mg + Al + Ni) 0.058 mol (Ni: 8.0 wt %) | 600 | 91.8 | 92.1 |
| | | 650 | 92.4 | 92.8 |
| | | 700 | 95.1 | 95.7 |
| | | 750 | 96.8 | 97.3 |
| | | 800 | 97.1 | 97.8 |
| | | 850 | 97.4 | 98.5 |
| | | 900 | 98.1 | 99.2 |
| Example 3 | Ni/(Mg + Al + Ni) 0.033 mol (Ni: 4.5 wt %) | 600 | 90.8 | 92.3 |
| | | 650 | 91.2 | 92.6 |
| | | 700 | 93.6 | 94.2 |
| | | 750 | 94.1 | 94.8 |
| | | 800 | 95.2 | 96.3 |
| | | 850 | 96.1 | 97.1 |
| | | 900 | 97.8 | 98.5 |
| Example 4 | Ni/(Mg + Al + Ni) 0.0019 mol (Ni: 0.2 wt %) | 600 | 90.1 | 91.1 |
| | | 650 | 91.2 | 92.3 |
| | | 700 | 93.1 | 94.1 |
| | | 750 | 93.8 | 94.4 |
| | | 800 | 94.2 | 95.1 |
| | | 850 | 95.6 | 96.2 |
| | | 900 | 96.2 | 97.8 |

TABLE 2-continued

Change in CH$_4$ conversion percentage depending upon reaction temperature (at GHSV = 10,000 h$^{-1}$)

| | Composition of catalyst | Reaction temperature (° C.) | CH$_4$ conversion percentage (%) S/C = 1.8 | S/C = 2.5 |
|---|---|---|---|---|
| Reference Example and Comparative Example | | | | |
| Reference Example | Ni/(Mg + Al + Ni) 0.1861 mol (Ni: 21.5 wt %) | 600 650 700 750 800 850 900 | 82.5 86.8 87.9 91.6 92.1 93.4 94.2 | 83.1 87.5 88.2 92.1 93.2 93.8 94.7 |
| Comparative Example | Ni/(α-Al$_2$O$_3$ + Ni) 0.081 mol (Ni: 8.8 wt %) | 600 650 700 750 800 850 900 | 87.1 88.5 91.7 92.2 93.8 94.2 95.2 | 88.6 89.5 92.7 93.2 94.8 95.2 96.6 |

TABLE 3

Change in CH$_4$ conversion percentage depending upon reaction time (at reaction time: 700° C.; GHSV = 2,500 h$^{-1}$)

| | Composition of catalyst | Reaction time (hr) | CH$_4$ conversion percentage (%) S/C = 1.8 | S/C = 2.5 |
|---|---|---|---|---|
| Examples | | | | |
| Example 1 | Ni/(Mg + Al + Ni) 0.058 mol (Ni: 8.0 wt %) | 24 150 350 | 93.1 92.8 93.4 | 95.5 95.5 94.9 |
| Example 2 | Ni/(Mg + Al + Ni) 0.058 mol (Ni: 8.0 wt %) | 24 150 350 | 93.5 93.7 93.2 | 94.5 94.3 95.6 |
| Example 3 | Ni/(Mg + Al + Ni) 0.033 mol (Ni: 4.5 wt %) | 24 150 350 | 90.9 89.9 90.1 | 92.4 92.1 91.8 |
| Example 4 | Ni/(Mg + Al + Ni) 0.0019 mol (Ni: 0.2 wt %) | 24 150 350 | 90.1 88.8 89.3 | 91.7 91.4 91.1 |
| Example 5 | Ni/(Mg + Al + Ni) 0.003 mol (Ni: 0.5 wt %) | 24 150 350 | 91.3 89.8 89.1 | 92.1 92.5 91.8 |
| Example 6 | Ni/(Mg + Al + Ni) 0.014 mol (Ni: 1.8 wt %) | 24 150 350 | 90.2 89.3 90.4 | 92.8 92.1 92.5 |
| Examples, Reference Example and Comparative Example | | | | |
| Example 7 | Ni/(Mg + Al + Ni) 0.0049 mol (Ni: 0.7 wt %) | 24 150 350 | 90.5 88.8 87.3 | 91.1 90.3 89.8 |
| Example 8 | Ni/(Mg + Al + Ni) 0.075 mol (Ni: 10.2 wt %) | 24 150 350 | 92.9 92.8 93.3 | 94.7 94.5 95.1 |
| Example 9 | Ni/(Mg + Al + Ni) 0.075 mol (Ni: 10.2 wt %) | 24 150 350 | 92.6 92.7 92.8 | 93.8 94.1 93.6 |
| Reference Example | Ni/(Mg + Al + Ni) 0.1861 mol (Ni: 21.5 wt %) | 24 150 350 | 93.1 92.8 92.6 | 93.6 93.4 92.9 |
| Comparative Example | Ni/(α-Al$_2$O$_3$ + Ni) 0.0811 mol (Ni: 8.8 wt %) | 24 150 350 | 87.2 87.2 87.4 | 87.7 87.3 87.2 |

TABLE 4

| | Composition of catalyst | Reaction time (hr) | Amount of carbon (%) S/C = 1.8 | S/C = 2.5 |
|---|---|---|---|---|
| Examples | | | | |
| Example 1 | Ni/(Mg + Al + Ni) 0.058 mol (Ni: 8.0 wt %) | 24 150 350 | 0.18 0.26 0.33 | 0.21 0.32 0.41 |
| Example 2 | Ni/(Mg + Al + Ni) 0.058 mol (Ni: 8.0 wt %) | 24 150 350 | 0.19 0.28 0.32 | 0.16 0.33 0.45 |
| Example 3 | Ni/(Mg + Al + Ni) 0.033 mol (Ni: 4.5 wt %) | 24 150 350 | 0.16 0.19 0.25 | 0.18 0.22 0.38 |
| Example 4 | Ni/(Mg + Al + Ni) 0.0019 mol (Ni: 0.2 wt %) | 24 150 350 | 0.11 0.21 0.32 | 0.14 0.25 0.38 |
| Example 5 | Ni/(Mg + Al + Ni) 0.003 mol (Ni: 0.5 wt %) | 24 150 350 | 0.14 0.22 0.35 | 0.18 0.27 0.42 |
| Example 6 | Ni/(Mg + Al + Ni) 0.014 mol (Ni: 1.8 wt %) | 24 150 350 | 0.15 0.23 0.36 | 0.17 0.28 0.43 |
| Examples, Reference Example and Comparative Example | | | | |
| Example 7 | Ni/(Mg + Al + Ni) 0.0049 mol (Ni: 0.7 wt %) | 24 150 350 | 0.12 0.23 0.34 | 0.16 0.28 0.41 |
| Example 8 | Ni/(Mg + Al + Ni) 0.075 mol (Ni: 10.2 wt %) | 24 150 350 | 0.18 0.27 0.32 | 0.22 0.31 0.44 |
| Example 9 | Ni/(Mg + Al + Ni) 0.075 mol (Ni: 10.2 wt %) | 24 150 350 | 0.17 0.29 0.38 | 0.27 0.36 0.42 |
| Reference Example | Ni/(Mg + Al + Ni) 0.1861 mol (Ni: 21.5 wt %) | 24 150 350 | 0.58 0.64 0.85 | 0.56 0.61 0.79 |
| Comparative Example | Ni/(α-Al$_2$O$_3$ + Ni) 0.0811 mol (Ni: 8.8 wt %) | 24 150 350 | 2.5 3.6 4.8 | 2.7 4.2 5.6 |

What is claimed is:

1. A catalyst for decomposition of hydrocarbons, comprising:
    (a) porous oxide particles containing magnesium and aluminum; and
    (b) fine metallic nickel particles which are present in the vicinity of surface of the porous oxide particles, and have an average particle diameter of 1 to 10 nm,
    wherein said catalyst having a nickel content of 0.15 to 12% by weight based on the weight of the catalyst, a molar ratio of nickel to a sum of magnesium, nickel and aluminum of 0.001 to 0.12, and a molar ratio of magnesium to aluminum (Mg:Al) is 4:1 to 1.5:1.

2. A catalyst for decomposition of hydrocarbons according to claim 1, wherein said catalyst has a specific surface area value of 20 to 400 m²/g.

3. A catalyst for decomposition of hydrocarbons according to claim 2, wherein said catalyst has a specific surface area value of 25 to 380 m²/g.

4. A catalyst for decomposition of hydrocarbons according to claim 1, wherein said catalyst is produced by heat-calcining laminar composite hydroxide-type particles comprising A composite hydroxide core particles containing magnesium and aluminum and a composite hydroxide layer containing magnesium, nickel and aluminum, which is formed on surface of the composite hydroxide core particles, and then heat-reducing the RESULTANT oxide particles to transform nickel oxide contained in the oxide particles into fine metallic nickel particles.

5. A catalyst for decomposition of hydrocarbons, comprising fine metallic nickel particles having an average particle diameter of 1 to 10 nm and a nickel content of 0.15 to 12% by weight based on the weight of the catalyst, which is produced by heat-calcining laminar composite hydroxide-type particles comprising A composite hydroxide core particles containing magnesium and aluminum and a composite hydroxide layer containing magnesium, nickel and aluminum which is formed on surface of the composite hydroxide core particles, and then heat-reducing the RESULTANT oxide particles to transform nickel oxide contained in the oxide particles into fine metallic nickel particles.

6. A catalyst for decomposition of hydrocarbons according to claim 5, wherein a molar ratio of nickel to a sum of magnesium, nickel and aluminum is 0.001 to 0.12.

7. A catalyst for decomposition of hydrocarbons, comprising:
    (a) porous oxide particles containing magnesium and aluminum; and
    (b) fine metallic nickel particles which are present in the vicinity of surface of the porous oxide particles, and substantially absent from a central portion of the porous oxide particles and have an average particle diameter of 1 to 10 nm,
    wherein said catalyst having a nickel content of 0.15 to 12% by weight based on the weight of the catalyst, a molar ratio of nickel to a sum of magnesium, nickel and aluminum of 0.001 to 0.12, and a molar ratio of magnesium to aluminum (Mg:Al) is 4:1 to 1.5:1, wherein the catalyst is capable of maintaining a methane conversion percentage at least 90% at a reaction temperature of 600° C. to 900° C., a molar ratio of steam to carbon (S/C) of 1.3 to 3.5 and a space velocity (GHSV) of 1,500 to 600,000 $h^{-1}$.

8. A process for producing the catalyst for decomposition of hydrocarbons as claimed in claim 1, comprising:
    mixing an anion-containing aqueous alkali solution, an aqueous magnesium salt solution and an aqueous aluminum salt solution together to form a mixed solution;
    after adjusting a pH value of the mixed solution to 9.0 to 14, aging the resultant mixed solution at a temperature of 60 to 250° C. to obtain a water suspension of composite hydroxide core particles containing magnesium and aluminum;
    adding to the water suspension, an aqueous magnesium salt solution, an aqueous nickel salt solution and an aqueous aluminum salt solution, such that a molar ratio of a sum of magnesium, nickel and aluminum contained in these solutions to a sum of the magnesium and aluminum added upon production of the core particles is 0.05 to 0.45;
    aging the resultant suspension at a pH value of 9.0 to 14 and a temperature of 60 to 250° C. to conduct a growth reaction for forming a laminar composite hydroxide coating layer on surface of the core particles, thereby obtaining laminar composite hydroxide particles;
    heat-calcining the laminar composite hydroxide particles at a temperature of 450 to 1,700° C. to obtain oxide particles; and
    then heat-reducing the thus obtained oxide particles at a temperature of 700 to 1,000° C. under a reducing atmosphere.

* * * * *